Patented Jan. 12, 1954

2,666,042

UNITED STATES PATENT OFFICE 2,666,042

PROCESS FOR PREPARING SEGMENTED COPOLYMERS

Kenzie Nozaki, El Cerrito, Calif., assignor to Shell Development Company, Emeryville, Calif., a corporation of Delaware No Drawing. Application June 13, 1952, Serial No. 293,430

16 Claims. (Cl. 260—45.5)

This invention relates to the copolymerization of polymerizable unsaturated organic compounds. More particularly, the invention relates to a process for producing "segmented" copolymers having relatively high and uniform molecular weights.

Specifically, the invention provides a process for producing "segmented" copolymers from special type monoethylenically unsaturated monomers having a terminal methylene group joined through an ethylenic linkage to a carbon atom which is joined to another substituent other than hydrogen and to a carbon atom of an organic radical, and dissimilar monomers containing a $>C=C<$ group, said copolymers being characterized particularly by their segmented molecular arrangement and their higher and substantially uniform molecular weights. These copolymers are produced according to the process of the invention by heating the said special type of monoethylenically unsaturated monomer in a liquid reaction medium to a relatively high temperature, e. g., above 90° C., for a short period, thereafter cooling the reaction mixture to a lower temperature and continuing the polymerization until there is substantially no unpolymerized special type monoethylenically unsaturated monomer present in the reaction mixture, and then adding the dissimilar monomer to the reaction mixture and continuing the polymerization until the said dissimilar monomer containing the $>C=C<$ group has been substantially polymerized.

This application is a continuation-in-part of my application, Serial No. 61,328, filed November 22, 1948.

Attempts have been made in the past to improve the properties of many of the homopolymers of the special type monoethylenically unsaturated monomers by copolymerizing the said monomers with various polymerizable compounds, the homopolymers of which display the desired superior property. The copolymerization is accomplished by mixing the special type monoethylenically unsaturated monomers with the desired dissimilar monomer and subjecting the resulting mixture to polymerization conditions, such as heat, light, and polymerization catalysts. When combined under these conditions, the two monomers usually add to the polymer nuclei in a more or less random fashion and the resulting polymer macromolecules are made up of a very complicated arrangement of the two kinds of monomers. Copolymers prepared from monomers A and B, for example, will have the A and B units arranged in the macromolecules in some such order as ABAABBBAABBA—. This method of producing the desired copolymers is not entirely satisfactory. It has been found, for example, that when the monomer units are distributed throughout the macromolecules in the above-described manner, they fail to impart the properties of their corresponding homopolymers and the resulting copolymers in many cases possess an entirely different set of properties. Furthermore, as there is usually no definite control over the order in which the monomers add to the polymer chain, the copolymers produced by this process rarely if ever have the same molecular structure and standardization of the copolymers is quite difficult. In addition, copolymers formed in this manner have a variety of different molecular weights and as a result are difficult to mold and yield products having defective physical properties.

It is, therefore, an object of the invention to provide a process for producing a new type of copolymers. It is a further object to provide a process for producing segmented copolymers from certain special type monoethylenically unsaturated monomers. It is a further object to provide a method for preparing copolymers that possess characteristic properties of the homopolymers of the individual monomers making up the said copolymer. It is a further object to provide a copolymerization process which yields substantially the same type of products in each operation. It is a further object to provide a process for preparing segmented copolymers having relatively high and uniform molecular weights. It is a further object to provide segmented copolymers from the above-described group of special type monoethylenically unsaturated monomers which have many unique and unobvious properties. It is a further object to provide segmented copolymers of the above-described group of special type monoethylenically unsaturated monomers which have unusual solution behavior. It is a further object to provide segmented copolymers of the above-described group of special type monoethylenically unsaturated monomers which are internally plasticized and may be used without further addition of softening and plasticizing agents. These and other objects of the invention will be apparent from the detailed description given hereinafter.

It has now been discovered that these and other objects may be accomplished by the process of the invention which comprises heating a special type of monoethylenically unsaturated monomer having a terminal methylene group joined through an ethylenic linkage to a carbon atom which is joined to another substituent other than hydrogen and to a carbon atom of an organic radical in a liquid medium which is a relatively poor solvent for the polymer of the above-described monomer to a relatively high temperature, e. g., above 90° C., for a short period and then reducing the temperature, preferably below 50° C., continuing the polymerization at the lower temperature until substantially all of the above-described monomer has been polymerized and then adding the dissimilar monomer containing a >C=C< group to the reaction mixture and continuing the polymerization until said dissimilar monomer has been substantially polymerized.

The process of the invention is based upon the discovery that when members of the above-described special group of monoethylenically unsaturated monomers are heated to a high temperature under above-noted conditions, they are able to form polymer nuclei which continue to exist as free radicals even after all of monomer has been consumed and the energy source has been removed. When a dissimilar monomer containing a >C=C< group is added to the reaction mixture containing these long-lived polymer radicals, the said dissimilar monomers add to the polymer nuclei in the ordinary manner. The resulting product is a "segmented" copolymer made up of two distinct segments joined end to end, such as A—B, segment A being made up entirely of the initial vinyl-type monomers and segment B being made up substantially of the dissimilar monomers. As the monomers are grouped together in one segment in the novel copolymers and are not distributed throughout the entire polymer chain, the said monomers are able to impart many of the properties of their corresponding homopolymers, and the final properties of the novel copolymers are usually a summation of the properties of the homopolymers of the monomers utilized in their production.

In addition, by limiting the period of exposure of the special monoethylenically unsaturated monomers to the high temperatures to just a short initial period, all of the polymer nuclei will be formed within substantially the same period of time and when the temperature is lowered, the chains will be able to grow to substantially the same length. The polymers formed by this method will, therefore, have substantially the same molecular weight and can be easily fabricated to produce resins having superior physical properties.

The discovery that this special group of monoethylenically unsaturated monomers form polymer nuclei having an indefinite life time was indeed surprising for it had been previously considered that the polymer nuclei formed from other ethylenically unsaturated compounds of this type had a life span of only a few seconds. When many of the more common ethylenically unsaturated compounds, such as vinyl chloride, acrylonitrile and methyl acrylate are heated to a high temperature as indicated above and then the temperature reduced, the active polymer nuclei formed in the reaction are readily terminated.

An important application of the process of the invention is its use in the production of "internally" plasticized polymers, i. e., polymers wherein the plasticizer is joined to the said polymer by a primary chemical bond. The production of this type of polymer is accomplished either by selecting as the initial monomer to be polymerized one of the above-described special type monoethylenically unsaturated monomers which form a soft, flexible polymer, and adding the monomer which forms the brittle polymer to the reaction mixture after the initial monomer has been completely polymerized, or by selecting the initial monomer as the one that forms a brittle polymer and then adding a dissimilar monomer which forms a soft, flexible polymer. In both cases, the resulting copolymer will possess the superior properties of the brittle homopolymer segment but will be more flexible due to the presence of the segment of the soft, flexible polymer. These plasticized polymers are superior to the resin plasticized with the conventional plasticizers as the plasticizing segment is chemically bound in the molecule and there is no chance of the placticizer being lost through volatilization.

A further important application of the process of the invention is its use in the preparation of polymers having superior solution behavior. Polymers having the unexpected property of having solubility in both water and oil may be obtained by the novel process, for example, by employing as the initial monomer one of the special type monoethylenically unsaturated monomers which possesses a group having water-soluble characteristics or can be converted to one having water-soluble characteristics, such as methyl methacrylate and methacrylonitrile, and employing as the dissimilar monomer a compound such as ethylene, isobutylene or styrene, which forms a polymer having oil-soluble characteristics. Such copolymers may also be prepared by using the monomer having oil-soluble characteristics as the initial monomer and then adding the monomer having the water-soluble characteristics. Copolymers prepared by the aforementioned methods are particularly useful as detergents and as dispersing agents for preparing suspensions and emulsions of various components, such as metal oxides, that will not be precipitated either in aqueous or hydrocarbon systems.

The special type monoethylenically unsaturated monomers that may be utilized in the production of the long-lived polymer radicals comprise the monomers having a terminal methylene group joined through an ethylenic linkage to a carbon atom which is joined to a substituent other than hydrogen and to a carbon atom of an organic radical. Examples of this particular group of special type monoethylenically unsaturated monomers are 2-chloropropene-1, 2-methyl-butene-1,2 - ethylbutene-1, alpha-chlorostyrene, methallyl chloride, methallyl acetate, ethallyl benzoate, alpha-chlorallyl caproate, dimethallyl phthalate, 3 - methallylcyclohexanone, alpha-chloro-4-ethylstyrene, alpha-chloroacrylonitrile, butyl 4-chloro-4-pentenoate, ethyl alpha-bromoacrylate, alpha-methyl-4-methoxystyrene, butyl alpha-chloroacrylate, 2-bromo-1-hepten-3-one, 4-methallylbenzonitrile, 4-chloro-4-pentenamide, 4-amyl-4-pentenamide, 4-butyl-4-penten-2-one, 4-iodo-4-pentenamide, 3-fluoro-3-butenenitrile, 3-chloro-3-butenenitrile, 5-isopropyl-5-hexenenitrile, 3-alpha-chlorovinyl-1-carbethoxycyclohexane, 4-methallyl-1-acetoxybenzene, 4-carbamyl-2-butyl-1-butene, alpha - methylvinylcyclopentane, beta - chloroallylbenzene, 4 - carboxy-2-chloro - 1 - pentene, 4-methallylbenzamide, 3-alpha-methylvinylcyclohexanamide, 2-methallyl-cyclohexanecarboxamide, 7-ethallyl-2-naphthamide, 7-ethallyl-2-naphthonitrile, 2-alpha-ethylvinylcyclohexanenitrile, 4 - ethallyl-2-cyclopentanenitrile, 3 - methallylcyclopentanone, 3-ethallyl-1-acetylbenzene.

The preferred monomers to be utilized in the process of the invention are those special type monoethylenically unsaturated monomers having a terminal methylene group joined through an ethylenic linkage to a carbon atom which is joined through a single bond to a member of the group consisting of a halogen atom or a hydrocarbon radical and is joined through the remaining single bond to the carbon atom of an organic radical, preferably those which are known to have a high activating influence on vinyl polymerization, such as the carboxy radical and carboxy-substituted radicals, carbalkoxy radicals and carbalkoxy-substituted radicals, cyano and cyano-substituted radicals, the amide and amide-substituted radicals, and the alkenyl radicals. These preferred monomers may be exemplified by butyl 2-methyl-2-propenoate, ethyl 3-methyl-3-butenoate, isobutyl 4-ethyl-4-pentenoate, amyl 4-butenyl-4-pentenoate, methallyl acetate, ethallyl benzoate, 2-methyl-2-propenenitrile, 3-hexenyl-3-butenenitrile, 4-butyl-4-pentenenitrile, 3-ethallyl-2-naphthamide, 5-isopropyl-5-hexenenitrile, 2-methyl-2-propenamide, 3-ethyl-3-butenamide, 3-hexenyl-3-butenamide, 4-isobutyl-4-pentenamide, 4-amyl-4-pentenamide, 3-methyl-3-buten-2-one, 3-ethyl-3-buten-2-one, 4-butyl-4-penten-2-one, 4-isopropyl-4-penten-3-one, 5-amyl-5-penten-2-one, and 5-ethyl-5-penten-4-one.

A particularly preferred group of special type monoethylenically unsaturated monomers are those of the general formula

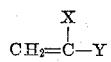

wherein X is a member of the group consisting of halogen atoms and alkyl radicals and Y is a member of the group consisting of $-(CH_2)_nCN$ radicals,

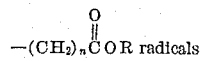

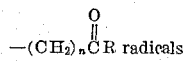

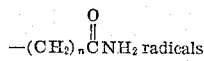

and alkenyl radicals, the $n$ in the foregoing radicals being an integer from 0 to 5 and R is a hydrocarbon radical, preferably an alkyl radical containing from 1 to 8 carbon atoms. Examples of this particularly preferred group of monomers are methacrylonitrile, methyl methacrylate, methyl isopropenyl ketone, 4-ethyl-4-pentenoate, amyl 4-amyl-4-pentenoate, 4-butyl-4-pentenenitrile, 4-chloro-4-pentenoate, 4-isobutyl-4-pentenamide, 4 - amyl - 4 - pentenamide, 3-chloro-3-buten-2-one, and 4-isopropyl-4-penten-3-one.

The component to be copolymerized with the above-described special type monoethylenically unsaturated monomers may be an dissimilar polymerizable unsaturated organic compound containing at least one <C=C> group in its molecule, such as maleic acid, maleic acid esters, tetrahaloethylenes, etc. Particularly preferred monomers to be copolymerized with the above-described vinyl-type monomers are the monomers containing at least one CH$_2$=C< group in their molecule. Examples of these monomers are butadiene-1,3, 2,3-dimethylbutadiene-1,3, piperylene, isoprene, chloroprene, styrene, alpha-methylstyrene, dichlorostyrene, vinyl naphthalene, vinyl phenol, acrylic acid, alpha-methyl acrylic acid, alpha-butyl acrylic acid, alpha-hexyl acrylic acid, methyl acrylate, methyl methacrylate, butyl methacrylate, propyl acrylate, vinylidene chloride, vinylidene bromide, vinyl chloride, vinyl bromide, acrylonitrile, methacrylonitrile, vinyl acetate, vinyl chloroacetate, vinyl benzoate, vinyl laurate, vinyl valerate, vinyl caproate, divinyl succinate, divinyl adipate, vinyl allyl phthalate, vinyl methallyl pimelate, vinyl methyl glutarate, vinyl acrylate, vinyl crotonate, vinyl methacrylate, vinyl ethyl ether, vinyl butyl ether, vinyl allyl ether, vinyl butyl ketone, methyl ethyl ketone, diallyl succinate, allyl chloride, methallyl chloride, allyl acrylate, allyl crotonate, allyl ketone, allyl ethers, and the like.

Particularly preferred monomers to be copolymerized with the above-described special type monoethylenically unsaturated monomers are the saturated esters of the alpha,beta-unsaturated organic acids, the vinylidene halides, the vinyl halides, the alpha,beta-unsaturated nitriles, the unsaturated esters of the saturated organic acids, the unsaturated ketones and the monoolefinic hydrocarbons containing from 2 to 8 carbon atoms. Examples of this particularly preferred group of monomers are acrylonitrile, methacrylonitrile, styrene, vinylidene chloride, vinyl chloride, ethylene, butylene, methyl methacrylate, methyl acrylate, and methyl isopropenyl ketone.

According to the process of the invention, the above-described special type monoethylenically unsaturated monomers are first added to a liquid medium which is a relatively poor solvent for the homopolymer of the selected monomer and the resulting mixture heated to a relatively high temperature. The reaction is conducted in a liquid medium which is a relatively poor solvent for the polymer of the selected special type monoethylenically unsaturated monomer as it has been found that the polymer free radicals are formed and more easily maintained in that type of medium. Many of the homopolymers of the above-described monomers are relatively insoluble in water and the polymerization is preferably conducted in an aqueous emulsion or a suspension system. Some of the polymers, however, are also insoluble in solvents, such as hexane, cyclohexane, benzene and toluene, and the like, and mixtures thereof, and the reaction may be conducted in the presence of these solvents. Many of the polymers are also insoluble in the monomers themselves and in these instances the polymerization can be conducted in the presence of the monomer.

If a polymerization catalyst is employed, it should be utilized in only relatively small concentrations as high catalyst concentrations are detrimental to the formation of long-lived polymer radicals. Examples of catalysts that may be employed are the peroxides, such as benzoyl peroxide, acetyl peroxide, hydrogen peroxide, tert-butyl peroxide, the peracids, such as persulfuric acid, peracetic acid, and perphthalic acid; the per-salts, such as potassium persulfate; the peresters, such as tert-butyl perbutyrate, and the like. In most cases the amount of catalyst should not exceed 1.5% by weight of the monomer being polymerized but the exact amount of catalyst that can be tolerated in the process may best be deduced for each case by routine determination.

In some cases molecular oxygen will tend to inhibit long-lived polymer radical formation and it is desirable to exclude the said oxygen from the reaction. The removal of the oxygen may be accomplished by any suitable method. It is preferably accomplished by freezing the mixture and evacuating the reaction chamber by means of a pump. In some cases it may be desirable to replace the withdrawn oxygen with an inert gas, such as nitrogen, methane, carbon dioxide, and the like.

Light is also preferably excluded from the reaction as its presence in some cases gives rise to the formation of polymers having less uniform molecular weights.

The initial high temperature to which the reaction mixture is to be heated will vary over a considerable range depending upon the presence or absence of catalysts, the type of monomer or monomers being polymerized, etc. If catalysts are employed, the temperature used will depend on the decomposition temperature of the said catalyst as the rate of formation of the long-lived polymer radicals depends in part upon the decomposition of the catalyst. If no catalyst is employed, the temperature will usually be governed by the type of monomer or monomers employed, some monomers being polymerized at much lower temperatures than others. Temperatures employed should, however, always be below the decomposition temperature of the monomers being polymerized. In general, temperatures between 90° C. and the decomposition temperatures of the monomers will be sufficient to bring about the desired formation of the long-lived polymer radicals. Preferred temperatures vary from 90° C. to 150° C.

The period of exposure of the polymerizable mixture to the initial high temperature will depend upon the specific temperature employed and the type of monomer being polymerized. The period should be as short as possible, however, in order to insure that all of the long-lived polymer radicals are formed at about the same time and have an opportunity to grow to the same length. In some cases, the time may be as short as a few minutes and in other cases an hour or more. When temperatures within the preferred range of 90° C. to 100° C. are employed, the period of exposure to the initial high temperature will preferably vary between 2 to 30 minutes, and more preferably between 4 to 10 minutes. Slightly longer or shorter periods may be used, however, if desired or necessary.

The reduction of the temperature to the lower range should be accomplished as rapidly as possible in order to prevent the possibility of polymer nuclei being formed during the intermediate temperature range. The reduction of the temperature may be accomplished by means well known in the art, such as the use of ice baths, etc.

The temperature to which the reaction mixture is to be reduced after the exposure to the initial high temperature may vary over a considerable range depending upon the type of monomer to be polymerized. If the monomer is one which ordinarily polymerizes quite rapidly, relatively low temperatures, such as of the order of −10° to +10° C. may be employed. If the monomer is one that is quite difficult to polymerize, higher temperatures, such as of the order of −10° C. to 50° C. may be needed to obtain a reasonable polymerization rate. Preferred low temperatures range from 0° C. to 25° C. As this type of polymerization is usually exothermic, it may be necessary to apply means, such as cold water condensers, etc. to maintain the reaction at the desired low temperature.

The polymerization of the initial monomer is continued until there is substantially no unpolymerized monomer present in the reaction mixture. This may be accomplished by continuing the polymerization until it appears that substantially all of the monomer has been polymerized, or alternatively, by interrupting the polymerization at any stage in the process and removing substantially all of the unpolymerized monomer from the reaction mixture by conventional means. A polymerization of 100% of the monomer, or a complete removal of all of the unpolymerized monomer is usually quite difficult to obtain as in many cases some of the monomer will be retained within the polymer chain, etc. Therefore, the expression "substantially all" as used throughout the specification and claims in regards to the polymerization of the initial monomer, or to the removal of the unpolymerized initial monomer from the reaction mixture is meant such a complete removal or polymerization as can generally be accomplished, e. g., a polymerization of at least 94% of the initial monomer, or a removal of all but 6% or less of the unpolymerized monomer.

After it has been determined that there is substantially no unpolymerized monomer present in the reaction mixture, the dissimilar polymerizable unsaturated organic compound containing at least one >C=C< group in its molecule is then added to the reaction mixture. The monomer added may be a single dissimilar polymerizable unsaturated organic compound or a mixture of two or more different compounds may be added. The monomer or monomers are preferably deoxygenated before being added to the reaction mixture containing the long-lived polymer radicals.

If the dissimilar monomer to be added is one which is unable to form long-livetd polymer radicals, i. e., is not a member of the above-described group of special type monoethylenically unsaturated monomers, the dissimilar monomer is preferably added to the reaction mixture at a relatively slow rate, e. g., at about the rate at which the dissimilar monomer is consumed.

The amount of the dissimilar monomer added will depend upon the ratio in which the said monomers are desired in the final product. Thus, for example, if the desired product is a copolymer of 25% polymethyl methacrylate and 75% polymethacrylonitrile, the amount of the methacrylonitrile added to the active polymethyl methacrylate will be about three times the amount of the active polymer.

The conditions employed in the reaction after the addition of the dissimilar monomer may vary over a considerable range. In general, the presence of factors, such as ultraviolet light, which tend to initiate new homopolymer nuclei of the added dissimilar monomer should be avoided as they give rise to the formation of contaminating homopolymers of the added monomers. The use of high temperatures should be avoided if the added dissimilar monomers are thermally polymerizable. If the added monomers are not thermally polymerizable, however, relatively high temperatures may be used as they merely increase the rate of polymerization. In general, temperatures ranging from 10° C. to 100° C. give satisfactory results. Preferred temperatures to be used with the thermally polymerizable monomers vary from about 10° C. to 30° C. In many cases, it is preferred to continue the polymerization at the same low temperature utilized in the latter phase of the polymerization of the initial monomer.

It is usually preferred to accomplish the polymerization of the added dissimilar monomer in the absence of molecular oxygen, at least during the initial stages of the reaction. In some cases, it may be desirable to replace the withdrawn oxygen with an inert gas, such as nitrogen, methane, carbon dioxide, and the like. Atmospheric, superatmospheric and subatmospheric pressures may be used.

It may also be desirable to add various additives before or at any time during this latter polymerization step. These additives include emulsion stabilizers, lubricants, dyes, plasticizers, and the like. The type and amount of the additive will depend upon the monomer being polymerized and the intended use of the final product.

If the dissimilar monomer added to the active polymer nuclei is a special type monoethylenically unsaturated monomer of the group described above and the conditions employed are those conducive to the formation of long-lived polymer radicals, the copolymer produced by the process will in turn be a long-lived polymer radical and a third dissimilar monomer may be added to form a three segment copolymer A—B—C, wherein A is a segment made up entirely of the initial special monoethylenically unsaturated monomer, B is a segment made up of the second special type monoethylenically unsaturated monomer, and C is a segment made up of the third dissimilar monomer. The process may be continued in the same manner to form a four, five, six, etc., segment copolymer providing the above-described conditions are maintained.

At the completion of the reaction, the copolymers may be separated from the reaction mixture by any suitable means, such as filtration, coagulation, and the like.

It is preferred to accomplish the polymerization in an aqueous emulsion as the required conditions for the production of the long-lived polymer radicals are more easily obtained by that method. According to this process the monomer to be polymerized is combined with a mixture of water, emulsifying agent and preferably a polymerization catalyst, maintained in the desired ratio and the resulting mixture subjected to the elevated temperature for the short period of time and then rapidly reduced to the lower temperature to complete the polymerization.

Emulsifying agents that may be employed in the preferred polymerization procedure include the soaps, such as sodium and potassium myristate, laurate, palmitate, oleate, stearate, rosinate, and hydroabietate; the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher amines like lauryl amine hydrochloride, and stearyl amine hydrobromide.

The amount of the emulsifying agent to be employed in the polymerization mixture will vary over a considerable range depending upon the particular material being polymerized, the amount of water present in the mixture and the type and amount of other ingredients added thereto. In general, the amount will vary from 0.1% to 5% by weight of monomer. The preferred amount of the emulsifying agent to be employed will vary between 0.1% to 1% by weight of monomer.

Catalysts that may be used in the preferred polymerization process, if desired, are the water-soluble peroxide catalysts, such as persulfuric acid, peracetic acid, and perphthalic acid; the per-salts, such as potassium persulfate; and the peroxide catalysts, such as hydrogen peroxide, acetyl peroxide, and sodium peroxide. Mixtures of catalysts may also be employed.

The amount of the catalysts to be employed in the aqueous emulsion may vary over a considerable range but should not exceed the maximum which results in prevention of formation of the long-lived radicals. In most cases, amounts of catalysts should not exceed 1.5% by weight of the monomer being polymerized. A preferred range of catalyst will be between .01% to 1% by weight.

It is usually desirable to maintain a low ratio between the amount of monomer and amount of water present in the initial aqueous emulsion, e. g., between 1:2 to 1:5, preferably 1:3. With lower phase ratios there is more monomer available per long-lived radical and the polymer chain is able to grow to a higher molecular weight.

Various other ingredients may be added to the aqueous emulsion before or during the polymerization process. These ingredients include emulsion stabilizers, such as polysaccharides, gum arabic, soluble starch, dextrine, lubricants, dyes and pigments. Plasticizers for the resins, such as dioctyl phthalates may also be added. The nature and amount of the modifier and stabilizer will depend upon the particular compound being polymerized and upon the intended use of the final product.

The aqueous emulsion containing the monomer and emulsifying agent, and catalyst if desired, is heated to the initial high temperature, preferably a temperature between 90° C. to 150° C. for a short period of time, and then the temperature of the emulsion is lowered to complete the polymerization.

The polymers will be formed in the aqueous emulsion as a latex which may be separated from the reaction mixture by any suitable means comprising coagulation with electrolytes, solvents, freezing, and the like.

The polymerization reaction may be executed in any convenient type of apparatus enabling the maintenance of the proper polymerization conditions. The process may be carried out in batch, semi-continuous or continuous manner. For large scale production it is preferred to conduct the process in a continuous manner. This operation is particularly desirable as it permits the maintenance of more stable conditions.

The copolymers produced by the process of the invention will have properties closely related to those of the homopolymers of the monomers contained in the said copolymers. As the properties may be conveniently predicted in most cases by a proper selection of monomers, the copolymers may be produced to fit substantially any desired industrial application. In general, resins prepared from the said copolymers may be cut, milled, and machined to produce various rigid articles of commerce, such as table tops, containers, toys, buttons, combs, etc. In a solvent solution the copolymers may be utilized in the preparation of impregnating agents, laminating agents, surface coatings, and the like.

They may also be subjected to extrusion and to injection and compression molding in the presence or absence of added diluents and plasticizers.

To illustrate the manner in which the invention may be carried out, the following examples are given. It is to be understood, however, that the examples are for the purpose of illustration and the invention is not to be regarded as limited to any of the specific conditions cited therein.

In each of the following experiments, the reaction was accomplished in the substantial absence of oxygen. This was accomplished either by withdrawing the air from the reaction chamber or by bubbling nitrogen through the reaction mixture. The experiments were also accomplished in the absence of light.

The polymers were coagulated by freezing at —20° C. or by precipitation with sodium chloride at 90° C.

Example I

About 100 parts of methacrylonitrile was mixed with 300 parts of water, 1 part sodium lauryl sulfate, and 1 part potassium persulfate. The mixture was emulsified and heated at 100° C. for 6 to 8 minutes and then reduced to 25° C. When substantially all of the methacrylonitrile had been polymerized, 50 parts of acrylonitrile was added to the reaction mixture and the reaction continued at 25° C. After all of the acrylonitrile had been polymerized, the polymer was separated and analyzed. Analysis indicated that it was made up of a unit of polymethacrylonitrile joined to a unit of polyacrylonitrile. Samples of this copolymer were tested for solubility in acetone. The samples were completely dispersed into milky colloidal solutions which were stable after three weeks standing and could not be filtered through a sintered glass filter funnel. This indicates that all the polyacrylonitrile was attached to relatively large acetone soluble polymethacrylonitrile segments, which aided dispersion.

Analysis of the above-described segmented copolymer also indicated that it had a relatively high and uniform molecular weight and could be used to produce shaped articles having excellent physical properties.

Example II

About 50 parts of methyl methacrylate are mixed with 600 parts of water and 0.33% sodium lauryl sulfate and the mixture deoxygenated. The mixture is then heated at 90° C. for 20 minutes and then the temperature reduced to 20° C. until substantially all of the methyl methacrylate is polymerized. 50 parts of deoxygenated vinyl chloride are then slowly added to the reaction mixture at about the rate at which it is being consumed and the polymerization continued at a temperature of about 40° C. until all of the vinyl chloride is polymerized. The resulting product is identified as a copolymer made up of a unit of polymethyl methacrylate and a unit of polyvinyl chloride.

As vinyl chloride could not polymerize thermally under the above-described experimental conditions, its polymerization could be explained only by the fact that the vinyl chloride units added to the active methyl methacrylate active polymer nuclei.

The copolymer of polymeric methyl methacrylate and polymeric vinyl chloride produced above possesses good flexibility and, in addition, possesses many of the desired characteristic properties of polyvinyl chloride not possessed by the conventional copolymer of methyl methacrylate and vinyl chloride.

Example III

About 100 parts of methacrylonitrile was mixed with 300 parts of water, 1 part sodium lauryl sulfate and 1 part potassium persulfate. The mixture was emulsified and heated at 100° C. for about 10 minutes and then reduced to 25° C. When substantially all of the methacrylonitrile had been polymerized, 50 parts of methyl methacrylate was added and the reaction continued at 25° C. After all of the methyl methacrylate had been polymerized, the polymer was separated and analyzed. Analysis indicated it was made up of a unit of polymethacrylonitrile joined to a unit of polymethyl methacrylate. Fractionation of the polymer by precipitation in solvents also indicated that all of the particles had substantially the same molecular weight.

Other segmented copolymers may be prepared by replacing the methyl methacrylate in the above process with equivalent amounts of each of the following: methyl acrylate, styrene and vinyl chloride.

Example IV

About 100 parts of methacrylonitrile are mixed with 300 parts of water, 1 part of sodium lauryl sulfate and 1 part potassium persulfate. This mixture is emulsified and heated at 95° C. for about 10 minutes and then reduced to 25° C. When substantially all of the methacrylonitrile had been polymerized, 50 parts of vinyl acetate are added and the reaction continued at 30° C. After all of the vinyl acetate has been polymerized, the polymer is separated and analyzed. Analysis indicated that it is made up of a unit of polymethacrylonitrile joined to a unit of vinyl acetate. This internally plasticized copolymer has many of the characteristic properties of the methacrylonitrile homopolymer but still has good flexibility due to the polyvinyl acetate segment.

Example V

About 100 parts of methyl methacrylate was mixed with 300 parts of water, 1 part sodium lauryl sulfate and 1 part potassium persulfate. The mixture was emulsified and heated at 100° C. for 6 to 8 minutes and then reduced to 25° C. When the reaction was substantially complete, 50 parts of methacrylonitrile were added to the reaction mixture and the reaction continued at 25° C. The resulting product was a copolymer made up of a unit of polymethyl methacrylate joined to a unit of polymethacrylonitrile and had properties similar to the segmented copolymer prepared in Example III.

Other segmented copolymers may be prepared by replacing the methacrylonitrile in the above process with equivalent amounts of each of the following monomers: vinyl acetate, styrene and acrylonitrile.

Example VI

About 100 parts of methyl isopropenyl ketone is mixed with 300 parts of water, 1 part sodium lauryl sulfate and 1 part potassium persulfate. The mixture is emulsified and heated at 100° C. for 20 minutes and then reduced to 40° C. When the monomer has been consumed, 65 parts of methacrylonitrile are added to the reaction mixture and the reaction continued at 40° C. The resulting product is identified as a copolymer made up of a unit of polymethyl isopropenyl ketone joined to a segment of polymethacrylonitrile.

Other segmented copolymers of this type may be obtained by replacing the methacrylonitrile in the above-described process with equivalent amounts of each of the following monomers: methyl methacrylate, vinyl acetate, butyl acrylate and beta-chloroacrylonitrile.

*Example VII*

About 100 parts of methacrylonitrile are mixed with 1 part of benzoyl peroxide and an equal volume of cyclohexane and the resulting mixture heated to 90° C. for 30 minutes. The temperature is then reduced to 40° C. and maintained at that temperature until susbtantially all of the methacrylonitrile has been polymerized. 50 parts of vinyl acetate are then slowly added and the polymerization continued at a temperature of about 40° C. The resulting product is identified as a copolymer made up of a unit of polymethacrylonitrile and a unit of polyvinyl acetate. The copolymer has properties similar to the copolymer produced in Example IV.

*Example VIII*

About 100 parts of methyl alpha-chloroacrylate are mixed with 600 parts of water and 0.5% sodium lauryl sulfate, the mixture deoxygenated and then heated to 95° C. for 30 minutes and then cooled to 30° C. until susbtantially all of the monomer has been polymerized. 100 parts of a deoxygenated mixture of equal parts of acrylonitrile and methacrylonitrile are then slowly added to the mixture and the polymerization continued at 30° C. The resulting product is a coplymer made up of a unit of poly(methyl alpha-chloroacrylate) methacrylate joined to a unit of a copolymer of acrylonitrile and methacrylonitrile.

I claim as my invention:

1. A process for copolymerizing a special type of monoethylenically unsaturated monomer having a terminal methylene group joined through an ethylenic linkage to a carbon atom which is joined to another substituent other than hydrogen and to a carbon atom of an organic radical with at least one dissimilar polymerizable monomer containing a >C=C< group which comprises heating the above-described special type of monoethylenically unsaturated monomer in a liquid reaction mixture which is a relatively poor solvent for the polymer of the said special monomer at a temperature above 90° C. but below the temperature at which substantial decomposition of the monomer occurs for a short period, and thereby effecting the formation of long-lived polymer nuclei of the said special type of monoethylenically unsaturated monomer, lowering the temperature to a temperature below 90° C. but above about —10° C. and thereby arresting further formation of any substantial quantity of new polymer nuclei and continuing the polymerization at that temperature until substantially all of the said special type of monoethylenically unsaturated monomer has been polymerized, and then adding the dissimilar monomer containing the >C=C< group and continuing the polymerization until at least a substantial part of that monomer has been polymerized.

2. The process as defined in claim 1 wherein the initial mixture containing the special type of monoethylenically unsaturated monomer is heated to a temperature above 90° C. but below 250° C. for a few minutes and then reduced to a temperature below about 50° C. but above —10° C.

3. The process as defined in claim 1 wherein the reaction is accomplished in an aqueous emulsion system.

4. The process as defined in claim 1 wherein initial phase of the reaction dealing with the polymerization of the special type of monoethylenically unsaturated monomer is accomplished in the substantial absence of molecular oxygen.

5. The process as defined in claim 1 wherein the initial special type of monoethylenically unsaturated monomer is a monomer of the formula

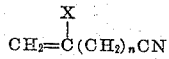

wherein X is an alkyl radical containing from 1 to 5 carbon atoms and $n$ is an integral from 0 to 5.

6. A process for copolymerizing a monoethylenically unsaturated monomer containing a terminal methylene group which is attached through an olefinic double bond to a carbon atom which is joined through single bonds to another carbon atom and to a member of the group consisting of halogen atoms and alkyl radicals, said monomer being capable of forming long-lived polymer free radicals, with at least one dissimilar polymerizable monomer containing at least one $CH_2=C<$ group, which comprises briefly heating, in the substantial absence of molecular oxygen, the said monoethylenically unsaturated monomer in a liquid medium which is a relatively poor solvent for the resulting polymer at a temperature above about 90° C. but below the temperature at which substantial decomposition of said monoethylenically unsaturated monomer is encountered thereby effecting the formation of polymer nuclei of the said monoethylenically unsaturated monomer, thereafter cooling the mixture to a lower temperature range below about 90° C. but above about —10° C. thereby arresting further formation of any substantial quantity of new polymer nuclei, maintaining the mixture in said lower temperature range until substantially all the monoethylenically unsaturated monomer is consumed, and then adding said dissimilar monomer to the resulting polymer-containing reaction mixture while continuing the polymerizing of the resulting mixture in said lower temperature range until at least a substantial part of said added dissimilar monomer has been consumed.

7. The process as defined in claim 6 wherein the monoethylenically unsaturated monomer is methacrylonitrile.

8. The process as defined in claim 6 wherein the reaction is accomplished in an aqueous emulsion system.

9. The process as defined in claim 6 wherein the temperature of the reaction mixture is reduced to a temperature below about 25° C. but above —10° C.

10. A process for copolymerizing a monoethylenically unsaturated monomer containing a terminal methylene group which is attached through an olefinic double bond to a carbon atom which is joined through single bonds to another carbon atom and to a side chain comprising a member of the group consisting of halogen atoms and alkyl radicals, said monomer being capable of forming long-lived polymer free radicals, with at least one dissimilar polymerizable unsaturated organic compound containing a CH₂=C< group in its molecule and being copolymerizable with the said monoethylenically unsaturated monomer, which comprises heating, in the substantial absence of molecular oxygen, the said monoethylenically unsaturated monomer in an aqueous emulsion containing from 0.01% to 1.5% by weight of monomer of a polymerization catalyst, and 0.1% to 1.5% by weight of monomer of an emulsifying agent to a temperature above 90° C. and below the decomposition temperature of the said monoethylenically unsaturated monomer for a brief period thereby effecting the formation of polymer long-lived free radicals of the said monoethylenically unsaturated monomer, rapidly cooling the mixture to a temperature below 50° C. but above −10° C. thereby arresting further formation of any substantial quantity of new polymer nuclei and maintaining the mixture in that low temperature range until substantially all of the monoethylenically unsaturated monomer has been polymerized, and then adding the said dissimilar polymerizable unsaturated organic compound to the reaction mixture, and continuing the polymerization at a temperature below 50° C. until at least a substantial part of said added monomeric polymerizable unsaturated organic compound is consumed.

11. A process as defined in claim 10 wherein the monoethylenically unsaturated monomer is methacrylonitrile and the dissimilar monomer is acrylonitrile.

12. A process as defined in claim 10 wherein the monoethylenically unsaturated monomer is methyl methacrylate and the dissimilar monomer is vinyl chloride.

13. A process as defined in claim 10 wherein the monoethylenically unsaturated monomer is methyl alpha-chloroacrylate and the dissimilar monomer is a mixture of acrylonitrile and methacrylonitrile.

14. The process as defined in claim 10 wherein the monoethylenically unsaturated monomer is methyl isopropenyl ketone and the dissimilar monomer is methacrylonitrile.

15. A process for copolymerizing methacrylonitrile with a dissimilar polymerizable monomer containing at least one CH₂=C< group which comprises heating, in the substantial absence of molecular oxygen, the methacrylonitrile in an aqueous emulsion containing less than 1.5% by weight of monomer of a water-soluble peroxide polymerization catalyst and from 0.1% to 5% by weight of monomer of an emulsifying agent, at a temperature above 90° C. and below 250° C. thereby effecting the formation of polymer long-lived free radicals of the methacrylonitrile, after a few minutes cooling the mixture to a temperature below about 90° C. but above about −10° C. thereby arresting further formation of any substantial quantity of new polymer nuclei, maintaining the mixture in said lower temperature range until substantially all of the methacrylonitrile is consumed, and then adding the said dissimilar monomer to the resulting polymer-containing reaction mixture while continuing the polymerization until at least a substantial part of the said dissimilar monomer has been polymerized.

16. The process as in claim 15 wherein the dissimilar monomer is a member of the group consisting of acrylonitrile, methyl methacrylate, methyl acrylate, styrene, vinyl chloride, vinylidene chloride, ethylene, butylene and methyl isopropenyl ketone.

KENZIE NOZAKI.

References Cited in the file of this patent

UNITED STATES PATENTS

| Number | Name | Date |
|---|---|---|
| 2,460,300 | Le Fevre et al. | Feb. 1, 1949 |
| 2,538,779 | Harrison et al. | Jan. 23, 1951 |